Oct. 25, 1966 P. W. LAMPMAN 3,280,791
APPARATUS FOR APPLYING COATING MATERIAL TO CONFECTIONS
Filed April 3, 1963 4 Sheets-Sheet 1
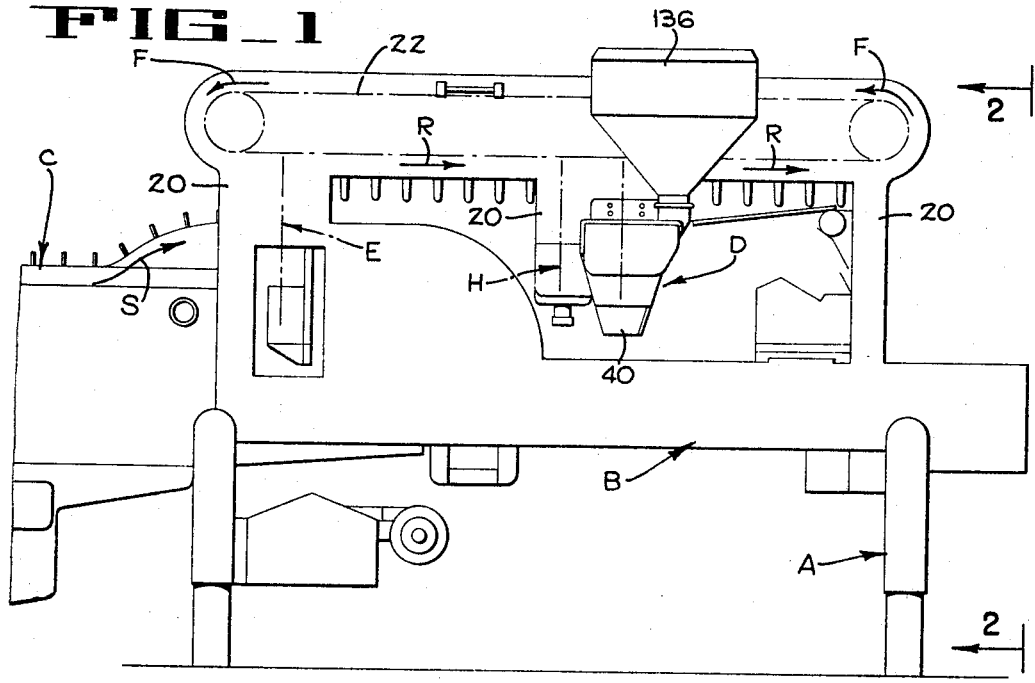
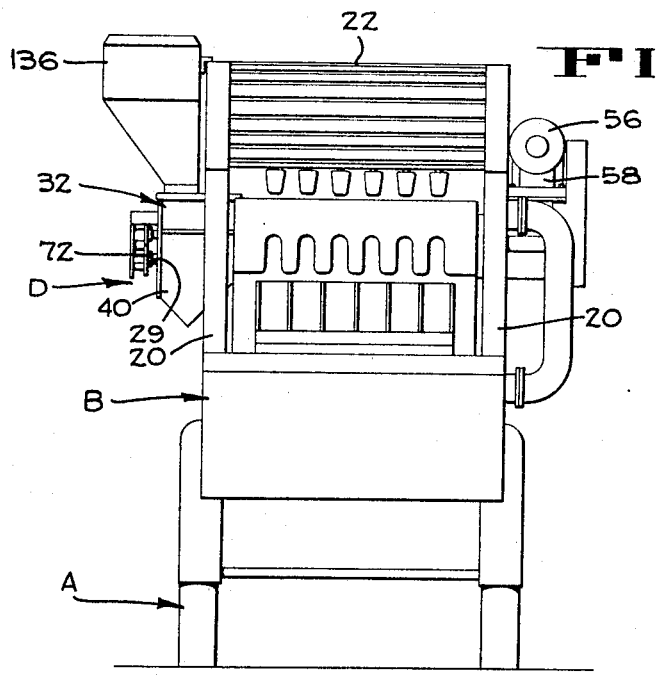
INVENTOR
PETER W. LAMPMAN
BY Hans G. Hoffmeister
ATTORNEY

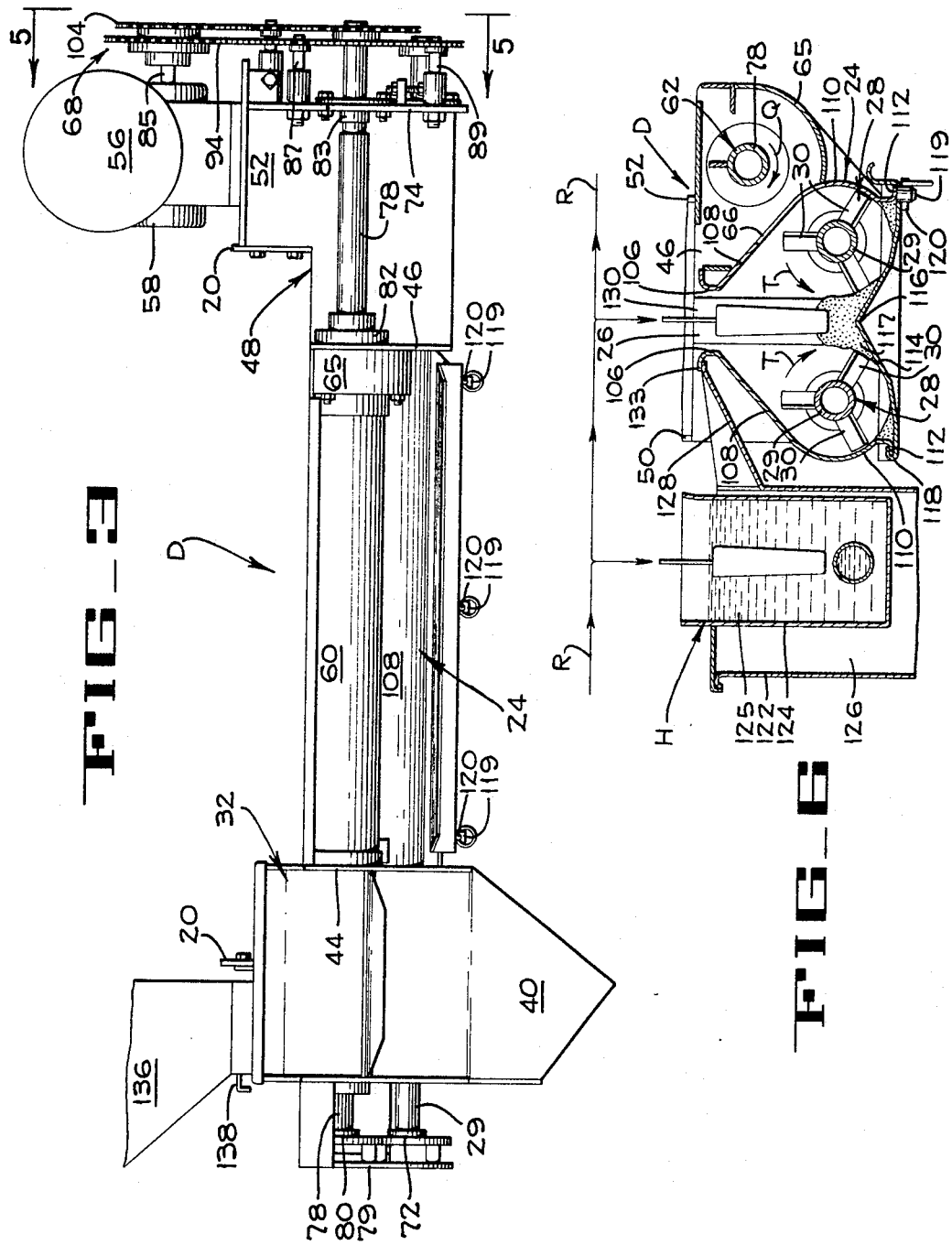

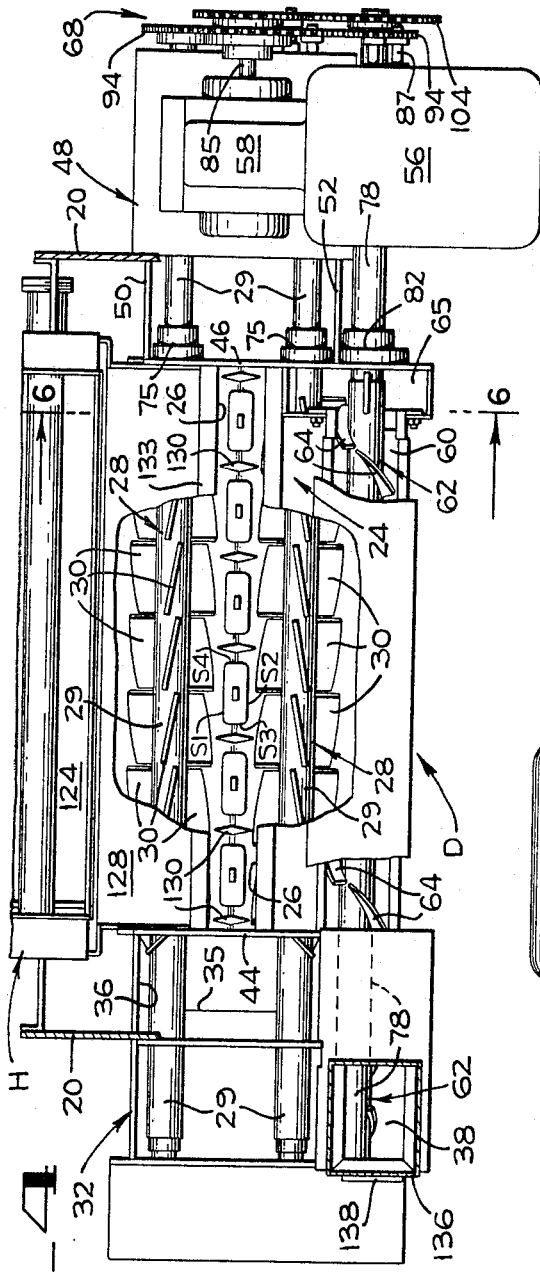
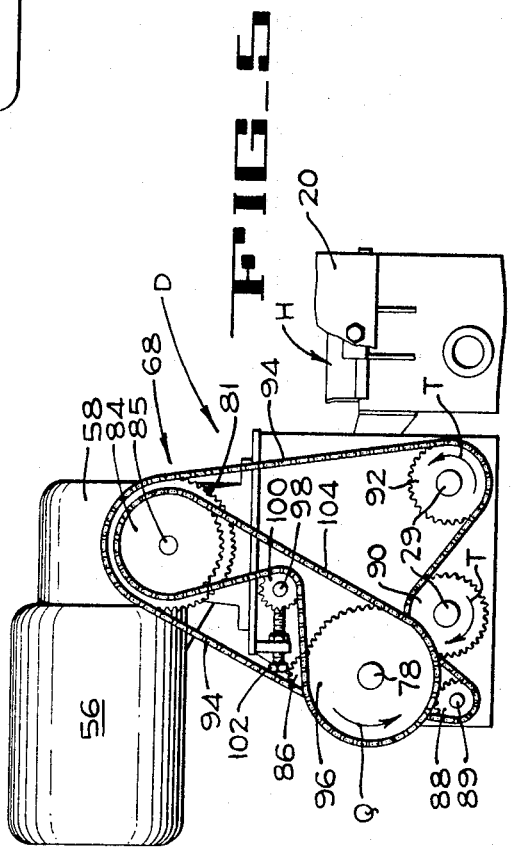
INVENTOR
PETER W. LAMPMAN
BY Hans G. Hoffmeister
ATTORNEY

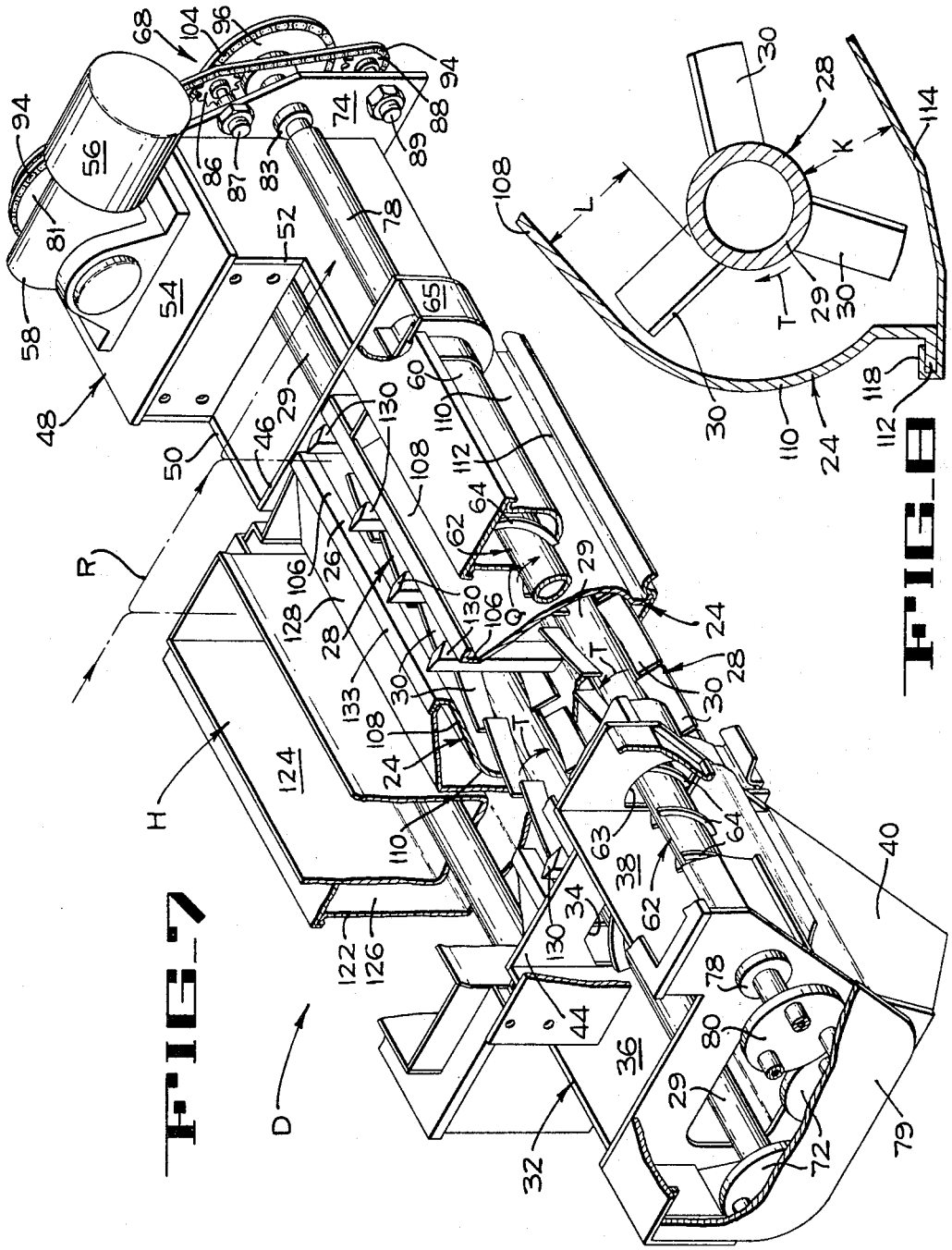

United States Patent Office 3,280,791
Patented Oct. 25, 1966

3,280,791
APPARATUS FOR APPLYING COATING
MATERIAL TO CONFECTIONS
Peter W. Lampman, North Sacramento, Calif., assignor to FMC Corporation, San Jose, Calif., a corporation of Delaware
Filed Apr. 3, 1963, Ser. No. 270,255
5 Claims. (Cl. 118—24)

This invention relates to coating apparatus, and more particularly to improved means for distributing propelled comminuted or granular material to all exposed surfaces of frozen confections.

In apparatus furnished heretofore for applying comminuted material, such as small pieces of coconut, to the surface of frozen confections, difficulty has been experienced in obtaining the coating of all parts of the confection. This difficulty is due to the fact that the mechanisms for propelling the material toward the confection cannot distribute the material in all directions simultaneously and as a result certain surfaces of the confection remain uncoated.

It is an object of the present invention to provide a coating mechanism capable of depositing coating material to those surfaces of the confection which do not face the path of the propelled coating material.

Another object is to provide improved baffle means for deflecting comminuted material to such surfaces.

Another object is to provide a new and improved coating apparatus including baffle means which distributes the coating material uniformly to the outer surface of the confection.

These and other objects and advantages of this invention will become apparent when taken in conjunction with the following drawings, in which:

FIGURE 1 is a side elevation showing the relation of a confection coating apparatus constructed in accordance with the principles of this invention, with a confection forming mechanism.

FIGURE 2 is an end view of the machine of FIGURE 1, taken looking in the direction of arrows 2—2 of FIG. 1.

FIGURE 3 is a side elevation of the coating apparatus.

FIGURE 4 is a plan, with parts broken away, of the coating apparatus shown in FIG. 3.

FIGURE 5 is an end elevation of the coating apparatus looking in the direction of arrows 5—5 of FIG. 3.

FIGURE 6 is a vertical section of the coating apparatus taken substantially along the line 6—6 of FIG. 4.

FIGURE 7 is a perspective of the coating apparatus with parts broken away, showing certain details of construction.

FIGURE 8 is a fragmentary enlarged section of one of the agitators and the adjacent part of the casing.

Referring now to FIGURES 1 and 2, there is shown a support structure A having mounted thereon a frame B which includes laterally spaced longitudinally extending side members 20. An endless conveyor 22 is mounted between the upper portions of the frames 20. For purposes of description, the direction in which the conveying surface of conveyor 22 moves is indicated by the arrows F. A portion of a confection forming apparatus C, which advances frozen confections in molds in the direction of arrow S with sticks projecting upwardly, is shown in its cooperative relation with the frame B. The conveyor 22 is provided with grippers that are arranged to grip the upwardly projecting sticks at a defrosting station E, remove the confections from the molds, and transport the confections in the direction R to a coating apparatus D which includes material distributing baffles constructed in accordance with the principles of this invention. The confection forming apparatus C advances the confections in longitudinally spaced rows with each row having a desired number of confections. The coating apparatus disclosed herein is adapted for use with a machine in which each row consists of six transversely aligned confections. The confection forming apparatus C, the conveyor 22 and their associated mechanisms may be of the type disclosed in the United States Patent to Rasmusson No. 3,031,978, and reference may be had to said patent for details of construction and operation not mentioned herein.

The rows of confections are transferred from apparatus C, an entire row at a time, to the conveyor 22 which carries them to a preliminary coating station H, and thence to the coating apparatus D. The coating apparatus D is secured to the side frame members 20 to extend transversely relative to the direction of movement of the lower run of the conveyor 22, and the conveyor 22 is arranged to present each row of confections to the coating zone of the coating apparatus D so that selected granular material may be deposited thereon. The particular manner in which the coating takes place is described more particularly hereinafter.

The coating apparatus D is the invention of John F. French and Marlin B. Rasmusson which is shown and described in U.S. application No. 251,283 filed January 14, 1963 and is assigned to the assignee of the present invention. Since my invention relates to the inclusion of means, hereinafter typically referred to as deflector members, for directing the comminuted material which is propelled by the coating apparatus D, to certain surfaces of the confection, the following description will describe the details of such coating apparatus.

Referring now to FIGURES 3 through 6, the dry coating apparatus of this invention includes an elongated casing 24 which is generally heart-shaped in cross-section (FIG. 6) with the apex thereof being truncated to form a generally rectangular opening 26 which extends longitudinally of the casing. A pair of elongated agitators 28 are rotatably mounted in the coating chamber defined inside the casing 24, and each agitator includes a series of radially extending blades 30 that are secured to a tubular shaft 29 at points spaced longitudinally of the shaft. As shown in FIG. 7, the blades 30 are secured to the outer periphery of the shaft 29 at a slight angle relative to the longitudinal axis of the shaft so as to form a slight helix. The blades 30 not only serve to engage and propel the granular material upwardly toward a selected zone of the casing 24 to coat the confections suspended therein but also effect a general migration or conveying movement of the granular material longitudinally relative to the casing 24.

A housing 32, which is secured to one end of the casing 24, has an opening 34 (FIG. 7) communicating with the interior of the casing 24 so that material conveyed by the blades 30 through casing 24 without being applied to a confection is received by the housing 32. More particularly, the housing 32 includes two compartments 36 and 38, with compartment 36 receiving granular material from the agitators 28 and compartment 38 forming a supply hopper for material that is to be circulated through the casing 24. As shown in FIG. 4 the compartment 36 has a passageway 35 in its floor leading to a lower discharge hopper 40 which receives unused granular material conveyed by the agitators 28 to the compartment 36 and directs it to a portable container (not shown) which may be used to again deposit the material in the supply compartment 38.

One end of the casing 24 is rigidly secured to a vertical plate 44 (FIG. 7) which forms part of the housing 32, and the opposite end of the casing 24 is rigidly secured to another vertical plate 46. The surfaces of the plates 44 and 46 define the longitudinal extent of the coating zone of the casing. A support housing 48 is disposed adjacent plate 46 and includes laterally spaced plates 50 and 52 having respective ends thereof rigidly secured to the plate 46, to form a supporting structure upon which the drive mechanism of the coating apparatus is located. A plate 54, extending between and secured to plate 50 and 52, is provided for mounting a motor 56, herein preferably an electric motor, and a gear reduction unit 58, cooperatively connected thereto, in a well known manner.

Coating material is supplied to the coating chamber through a U-shaped trough 60 which extends alongside casing 24 and has the opposite ends secured to the plate 44 and to the plate 46 and is located closely adjacent and generally parallel to the casing 24, as shown in FIG. 7. An elongated conveyor 62, preferably a screw conveyor initiating from the supply compartment 38 and extending through an opening 63 in the plate 44, terminates at the plate 46. The conveyor 62 is provided with discontinuous helical flights 64 which are operative, when the conveyor is rotated, to convey material from the compartment 38 longitudinally relative to the trough 60 toward the plate 46. Although conveyor 62 is shown with helical flights of a particular form, the principles of this invention can be practiced by using other conveying apparatus. The portion of the trough adjacent the plate 46 has a generally radially enlarged portion 65 which receives granular material conveyed by the conveyor 62. An opening 66 (FIG. 6) provides communication between the radially enlarged portion 65 and the interior of the casing 24 so that granular material received by portions 65 is transferred to the portion of the interior of casing 24 adjacent the plate 46.

Rotation of the agitators 28 in the direction indicated by arrows T and rotation of conveyor shaft 78 in the direction of arrow Q is effected by a common drive train generally indicated by the numeral 68. As shown in FIG. 7, the shafts 29 of the agitators 28 have respective ends that extend through the housing 32 and are mounted for rotation relative thereto in bearings 72. The opposite ends of the shafts 29 extend through the plate 46 and through a mounting plate 74 which is secured to the support 48. Suitable bearings and seals 75 (FIG. 4) are provided on mounting plate 46 for rotatably supporting the shafts 29 and for confining the granular material, respectively, in the casing 24. The feed conveyor 62 includes a shaft 78 (FIG. 4) extending through the storage compartment 38 with the end portion thereof rotatably journalled, by means of a bearing 80 (FIG. 3), in a wall 79 of the housing 32. At the opposite end of the unit, the shaft 78 extends through an opening in the plate 46, which is provided with a seal and a bearing 82, and through an axially aligned opening in mounting plate 74. Another bearing 83, secured to the mounting plate 74, is provided for rotatably supporting a shaft portion adjacent the end thereof.

Referring now to FIG. 5, the drive train or transmission 68 includes a pair of sprockets 81 and 84 keyed in side-by-side relation on a shaft 85 which is the output shaft of the gear reducer 58. The sprockets 81 and 84 are operatively connected by means of endless flexible tension devices, preferably chains, for driving the agitafor shafts 29 and the shaft 78 of the feed conveyor in a predetermined direction and at predetermined speeds. It will be noted by inspection of FIGS. 4 and 5 that the power train for the shaft 78 and for the two shafts 29 is located, respectively, in closely adjacent parallel planes so that the respective chains and the respective reaction elements, herein preferably shown to be sprockets, are located in such planes. The power train for the shafts 29 includes a suitable idler sprocket 86 rotatably mounted on a stub shaft 87 (FIG. 4) which is secured to the mounting plate 74. In order to maintain a predetermined tension on the sprocket chain associated with the sprocket 86, the stub shaft 87 may be mounted on the plate 74 so that it is slidable or pivotally movable as a unit relative to the plate 74 with such movement resulting in applying a predetermined tension to the sprocket chain associated therewith. As shown in FIG. 5, another idler sprocket 88 is rotatably mounted on a shaft 89, which shaft is, in turn, secured to the mounting plate 74. The shafts 29 have sprockets 90 and 92, of substantially the same diameter, suitably keyed thereto in any desirable manner so that the torque applied to the sprockets 90 and 92 by the chain associated therewith causes rotation of the shafts 29. Since the sprockets 81, 86, 88, 90 and 92 are located in a common plane, an endless chain 94 of appropriate length is trained, in the manner shown about such sprockets. Therefore, rotation of the shaft 85 and of the sprocket 81 causes, through the agency of the chain 94, rotation of the sprockets 86, 88, 90 and 92. Referring to FIG. 5 it will be noted that the chain 94 is trained about sprockets 90 and 92 in such a manner that rotation of the shafts 29 in opposite directions is effected. The desired direction of rotation of the shafts 29 is indicated by the arrows T.

The drive for the feed conveyor shaft 78 includes the sprocket 84, which is secured to the shaft 85 for rotation therewith, and a sprocket 100 that is rotatably mounted on an idler shaft 98 and located in a plane containing the sprocket 84. A suitable adjustment 102 is provided for slidably moving the idler shaft 98 so that a predetermined tension can be applied to the chain associated therewith. The shaft 78 has a sprocket 96 suitably keyed thereto in order to impart rotation to the shaft 78. A chain 104 is trained about the sprockets 84, 100 and 96, in the manner indicated in FIG. 5, whereby movement of the chain 104, caused by rotation of the sprocket 84, imparts rotation to the sprockets 100 and 96. Accordingly, rotation of the conveyor shaft 78 is effected, in the direction indicated by the arrow Q, by the sprockets 84, 100, 96 and the chain 104.

Certain of the advantages derived from the present coating apparatus are due to the formation of the casing 24 so that its cooperation with the action of the agitators 28 results in a high degree of turbulence of the selected granular particles while effecting a uniform distribution of such particles in a predetermined zone of the casing 24. In FIG. 6, which shows a cross-section of the coating apparatus taken substantially along the line 6—6 of FIG. 4, the casing 24 is substantially heart-shaped in form as shown. The upper side walls of the casing 24 are formed by vertically disposed longitudinally extending spaced wall portions 106. The opening 26 provides access to the coating zone of the interior of the casing for the confections which are to be coated. Wall portions 108, diverging downwardly and outwardly, define the intermediate portion of the side walls of the casing 24 and such walls have generally arcuate portions 110, oppositely oriented as shown, defining the lower portion of the side walls. The walls portions 110 terminate respectively in longitudinally extending laterally spaced horizontal flanges 112 which are provided for releasably supporting the bottom wall of the casing 24. Such bottom wall, which is indicated by the numeral 114, extends for the entire length of the casing 24. An apex 116 is formed on the bottom wall 114 substantially equi-distant from, and parallel to, the opposite sides of the bottom wall 114. One of the longitudinally extending lateral sides of the bottom wall 114 has formed thereon a U-shaped channel 118 which is adapted to receive, between the spaced sides thereof, the horizontal flange 112 of one wall portion 110 to provide a hinge connection. The opposite longitudinally extending lateral side of the bottom wall 114 terminates below the flange 112 of the other wall portion 110 and has an opening adapted to receive a short cylindrical rod 119 that is secured to and projects downwardly from the flange. A pin 120 is adapted to be inserted in a transverse hole in the rod 119 to releasably secure the bottom wall 114 in place.

The coating zone of the casing 24 is located in a plane equi-distant from the walls 106 and containing the apex 116. The confection desired to be coated is located in such a zone by the conveyor 22 in a manner to be particularly described in the hereinafter description of the operation of this invention.

Still referring to FIG. 6, it will be noted that the agitators 28 are located in the casing 24 adjacent the arcuate portions 110, respectively. Such a location, the particular configuration of the casing 24, and the motion imparted to the granular particles by the agitators 28 gives rise to a substantially uniform distribution of the granular material and, at the same time, the configuration of the casing requires a relatively small amount of material at any one time in the casing to achieve the desired density and uniformity of coating on the confection. After the coating apparatus has been supplied with a sufficient amount of granular material, a mound 117 of such granular material having the illustrated cross-sectional shape, is formed extending the entire length of the casing 24 and being generally symmetrical relative to the plane contained in the coating zone. It is to be appreciated that the particular form of the mound 117 is a function of the angle of repose of the selected granular material assuming other factors to be constant. But regardless of the type of granular material used, the peak of the mound 117 must be a sufficient distance above the apex 116 so that the end surface of the confection comes in contact therewith in order to achieve coating of such surface.

Referring to FIG. 8, an inlet channel K, associated with each agitator 28, extends the entire length of the casing 24. A discharge channel L, also associated with each agitator 28, is longitudinally co-extensive with the channel K. Accordingly, the granular material engaged by the rotating blades 30 is moved through a generally arcuate path, initiating at the inlet K and terminating at the discharge L, and is projected upwardly into the coating chamber to engage the exposed surfaces of the confection.

It is to be particularly noted that the cross-sectional area of flow, from the discharge channel L to the coating zone of the casing 24, increases rapidly in size toward the coating zone. Such an increase causes diffusion of the particles as they traverse the space from the discharge channel L to the coating zone, which diffusion, in conjunction with the diverse energy levels of the granular particles, achieves a more uniform distribution of the particles on the confection located in the coating zone.

The above described action of the agitators achieves the desired distribution pattern of granular material mainly on the side faces or surfaces S1 and S2 (FIG. 4) of the confection which are exposed to the trajectory of the granular particles but, as should be appreciated, the end faces or surfaces S3 and S4 of the confection which are generally parallel to such trajectories do not normally intercept and retain a sufficient number of particles to achieve a density of coating substantially equal to the density of coating on the surfaces exposed to the particle trajectory. In accordance with the present invention, this problem is solved by providing, in the coating zone of the casing 24, baffles or deflection members 130. The deflection members 130 are located in the coating zone of the casing 24 and are longitudinallly spaced and oriented to lie in parallel planes which are normal to the longitudinal axes of shafts 29, for example. As shown, the deflectors, which in the preferred form are diamond-shape in cross-section, are supported by the casing 24 and are spaced to receive a confection therebetween. Thus, a certain part of the granular material propelled by the blades 30 strikes the baffles 130 at an angle and ricochets therefrom to strike and be retained by the surface of the confections, respectively, which are located in the spaces between the baffles 130.

The coating apparatus also provides means for applying a preliminary coating of vegetable oil or the like to the outer periphery of the confection at station H, with the application of the oil being accomplished by immersing the confection in the oil before it is positioned in the coating zone in the casing 24. Considering FIGS. 6 and 7 together, there is shown an elongated generally rectangular trough 122 which is located laterally adjacent the casing 24 and is substantially longitudinally co-extensive therewith. A tank 124, located in the trough 122, and also being generally rectangular in form, is provided to contain a suitable preliminary coating material, herein preferably vegetable oil, which is applied to the outer surface of the confection before the confection is dry coated. As shown, the tank 124 is dimensioned to form with the trough 122 a generally rectangular space 126 around the tank 124 which space serves, in part, as an overflow for oil which may flow over the upper end of the tank 124. A formed pan 128, commencing from the lower surface of a flange 133, is provided for accumulating and returning to the trough 122 any excess oil which may drip from the confections as they are transferred between the tank 124 and the opening 26 by the conveyor 22.

In describing the operation of the disclosed preferred embodiment it will be assumed that the apparatus has been primed with selected granular material so that the conveying action of the conveyor 62 and the agitating and conveying action of the agitators 28 can be achieved. From any suitable source of electrical energy, the motor 56 is electrically energized to effect rotation of the shaft 85 and sprockets 81 and 84 secured thereon. By means of the sprocket chains 94 and 104, rotation is imparted, in the indicated directions, to the shaft 78 and the shafts 29. With such shafts rotating, granular material deposited in the supply compartment 38 is conveyed, as viewed in FIG. 7, toward the plate 46. The granular material so conveyed is deposited in the radially enlarged portion 65 and thereafter, by means of opening 66, the granular material is conveyed to the interior of the casing 24. From this point the blades 30 on the shafts 29 propel the granular material upwardly toward the coating zone and certain of the particles adhere to the outer surface of the confections which are located in the coating zone by the conveyor 22, the inclined side walls 108 of the casing being effective to direct the particles inwardly toward the articles, and the deflectors or guide plates being effective to intercept the material moving upwardly and material directed inwardly by the side walls and to direct the material toward the end faces of the confection. All of the particles so propelled do not adhere to the surface of the confection desired to be coated, since for example, there are areas of the coating zone which do not have any part of the outer surface of the confection located therein and, of course, a particle may strike a portion of the surface of a confection which has already been coated. In normal operation, the granular material which has not adhered to the outer surface of confections is gradually conveyed, by the blades 30, toward the compartment 36 and through the opening 34. The passageway 35, formed in the bottom of the compartment 36, permits the granular material conveyed thereto to drop or fall to the discharge hopper 40. The granular material accumulated in the portable container below the discharge hopper 40 is removed and deposited in a hopper 136 leading to compartment 38 so that it can be recirculated through the coating apparatus in the described manner.

Referring now to FIG. 7, the path described by the conveyor 22 is such that a row of confections is moved transversely downwardly relative to the direction R in order to momentarily immerse a row of confections in the tank 124 as shown. The conveyor then lifts the row of confections transversely upwardly from the tank 124 and subsequently moves the row longitudinally to the opening 26. Any excess oil which may drip from the confection prior to arriving to the opening 26 falls on the pan 128 and is returned to the trough 122. Again the conveyor 22 moves the row of confections transversely downwardly through the opening 26 and into the coating zone of the casing 24 where the granular material propelled by the blade 30 is applied to the outer surface of the confections. After a predetermined elapsed time, the row of confections is moved transversely upwardly and then in the direction R to a subsequent station wherein the conveyor 22 releases the entire row of confection so that they may be deposited into suitable containers, such as bags.

If desired, the rate at which the granular material flows from the hopper 136 to the compartment 38, within which a portion of the screw conveyor 62 is located, may be controlled in order to regulate, in turn, the amount of granular material being recirculated. A shutter mechanism or gate 138 (FIG. 3) comprising a planar plate is mounted for slidable movement, in a plane containing the throat of the hopper 136, so that the rate of flow of granular material from the hopper 136 to the compartment 38 may be varied. Such a variation is, in turn, realized in the casing 24 wherein the amount of granular material therein is dependent upon the rate at which the screw conveyor 62 delivers granular material to the casing 24. Alternatively, or in conjunction with the gate 138, variation in the feed rate of granular material may be achieved by selectively changing the speed at which the screw conveyor shaft 78 rotates. In achieving the variations of shaft speed, the sprocket 96 is replaced with a larger or smaller sprocket to decrease or increase, respectively, the speed at which the shaft 78 rotates. It must be observed, however, that appropriate adjustments of the idler sprocket 100 must be effected when changing the size of the sprocket on shaft 78 in order to maintain a predetermined tension on the chain 104.

Thus it is seen that this invention provides a compact apparatus having a high degree of efficiency. The deflector plates 130, cooperating with the rotary agitators 28, make possible a more complete, uniform coating of confection than has been attained heretofore.

It will be understood that modifications and variations may be effected without departing from the scope of the present invention as defined by the claims appended hereto.

Having thus described my invention, what I claim as new and desire to protect by Letters Patent is:

1. In a coating apparatus having a housing enclosing a coating chamber with a coating zone therein, means for positioning uniformly in said coating zone articles having end surfaces and side surfaces, means for hurling granular coating material into said coating zone so that a portion of said hurled material is intercepted by the side surfaces, the improvement comprising deflector means disposed in said chamber between adjacent articles and having guide surfaces to redirect other portions of said hurled material at the end surfaces without interfering with the granules directed at the said side surfaces.

2. In a coating apparatus having a housing providing a coating chamber with a coating zone therein, said chamber being defined by spaced generally vertical end walls and by spaced side walls that converge upwardly and inwardly to terminate in said coating zone, means for positioning articles to be coated in said chamber with side surfaces of the articles facing said inclined side walls and end surfaces of the articles disposed generally normal to said side walls, and means for hurling coating material upwardly and inwardly in said chamber into said coating zone where a portion of said material is intercepted by the side surfaces, the improvement comprising a plurality of generally vertical deflector members mounted in said chamber adjacent said articles, each deflector being substantially diamond-shaped in horizontal cross-section, and having a surface partially facing a side wall of said chamber and partially facing the end surface of an adjacent article to redirect other portions of said coating material against the end surfaces of said articles.

3. In a coating apparatus having a chamber formed by two parallel curved wall channels having abbreviated inner walls joined together and outer walls each of which includes a flat wall portion extending upwardly and inwardly to form one side of a slot longitudinally co-extensive with the chamber and disposed above the junction of the inner walls and adapted to receive confections lowered through said slot, two impeller shafts mounted within said chamber, one of which is rotatably mounted on either side of the inner wall junction, a plurality of impeller blades on said shafts, each of said blades being adapted to sweep through the space between its respective shaft and the curved wall portion of its associated channel, and to coact with a flat wall portion to project any coating granules lying therein in a direct trajectory toward the region directly below said slot, the improvement comprising vertically erect deflectors having diamond-shaped horizontal cross-sections interspersed within said chamber in the zone beneath said slot and between said confections.

4. In a coating apparatus having a housing enclosing a coating chamber with a coating zone therein, means for positioning in said coating zone a row of articles having side surfaces and end surfaces, means for hurling coating material in a straight line into said coating zone so that a portion of said hurled material is intercepted by the side surfaces of the articles, a plurality of deflectors disposed within said chamber, each deflector being positioned in a plane which is transverse to said row and extending between adjacent articles, each deflector having at least one surface for deflecting other portions of the hurled material against the end surfaces of adjacent articles.

5. Apparatus defined by claim 4 wherein said deflectors have diamond-shaped horizontal cross-sections and are located partly within the spaces between adjacent articles whereby the deflectors are capable of diverting a single stream of material into two streams, each of which is projected toward a separate end surface of an adjacent article.

References Cited by the Examiner

UNITED STATES PATENTS

| | | | |
|---|---|---|---|
| 2,115,079 | 4/1938 | Lilley et al. | 118—309 X |
| 2,577,433 | 12/1951 | Robb | 107—1.2 X |
| 2,710,588 | 6/1955 | Parry et al. | 118—308 X |
| 3,014,451 | 12/1961 | Kindman | 118—24 |
| 3,036,533 | 5/1962 | Burt et al. | 118—309 X |
| 3,129,144 | 4/1964 | Kindman | 118—24 |

FOREIGN PATENTS

| | | |
|---|---|---|
| 4,365 | 1913 | Great Britain. |
| 565,594 | 7/1957 | Italy. |

MORRIS KAPLAN, *Primary Examiner.*

RICHARD D. NEVIUS, WALTER A. SCHEEL,
*Examiners.*

J. A. HAUG, J. P. McINTOSH, *Assistant Examiners.*